United States Patent [19]

Takahashi

[11] Patent Number: 5,666,699
[45] Date of Patent: Sep. 16, 1997

[54] CORD FASTENER

[75] Inventor: Yoshinobu Takahashi, Toyama-ken, Japan

[73] Assignee: YKK Corporation, Tokyo, Japan

[21] Appl. No.: 678,481

[22] Filed: Jul. 9, 1996

[30] Foreign Application Priority Data

Jul. 11, 1995 [JP] Japan ................... 7-207299

[51] Int. Cl.$^6$ .............................................. F16G 11/00
[52] U.S. Cl. ................... 24/115 G; 24/115 M; 24/136 L
[58] Field of Search ...................... 24/115 G, 115 A, 24/115 M, 115 F, 136 L

[56] References Cited

U.S. PATENT DOCUMENTS

| | | | |
|---|---|---|---|
| 4,724,584 | 2/1988 | Kasai | 24/115 G |
| 4,794,673 | 1/1989 | Yamaguchi | 24/115 G |
| 5,323,514 | 6/1994 | Masuda et al. | 24/115 G |
| 5,345,657 | 9/1994 | Shimizu | 24/115 G |
| 5,365,641 | 11/1994 | Watanabe et al. | 24/115 G |
| 5,379,496 | 1/1995 | Krauss | 24/115 G |

FOREIGN PATENT DOCUMENTS

| | | |
|---|---|---|
| 0 228 656 | 7/1987 | European Pat. Off. . |
| 6-17511 | 3/1994 | Japan . |
| 2 292 176 | 2/1996 | United Kingdom . |

*Primary Examiner*—Victor N. Sakran
*Attorney, Agent, or Firm*—Hill, Steadman & Simpson

[57] ABSTRACT

A cord fastener comprises a fastener body having a hollow and a pair of aligned first cord insertion through-holes communicating with the hollow, and a slide slidably inserted in the hollow of the fastener body and having a pair of aligned second cord-insertion through-holes. The slide has a head, a pair of resilient legs extending downwardly from a lower surface of the head and a pair of supporting arms extending downwardly from the lower surface of the head. Each of the second cord-insertion through-holes has an upper portion contiguous to the lower surface of the head.

6 Claims, 4 Drawing Sheets

CORD FASTENER

BACKGROUND OF THE INVENTION

1. Field of the Invention

This invention relates to a cord fastener for controllably fastening a cord used for a garment, a bag, a helmet, headgear, etc.

2. Description of the Related Art

As disclosed in, for example, Japanese Utility Model Laid-Open Publication No. Hei 6-17511, a conventional cord fastener comprises a spherical synthetic-resin fastener body with a cylindrical hollow, and a synthetic resin piston slidably inserted in the fastener body. The fastener body has a pair of first cord-insertion holes communicating with the hollow. The fastener body has first and second engaged portions on the respective sides of the first cord-insertion holes, and the piston has engaging portions engageable with the first and second engaged portions, and a second cord insertion-hole to be aligned with the first cord-insertion holes when the engaging portions are in engagement with the second engaged portions so that a cold can be inserted through the first cord-insertion holes and the second cord-insertion hole. With further depression of the piston, the engaging portions come into engagement with the first engaged portions to lock the inserted cord in a bent and compressed form.

However, in this conventional cord fastener, since the piston's second cord insertion hole extends through a pair of spaced leg portions projecting downwardly from a head of the piston, the two second cord insertion hole portions are not continuous so that the leading end of the cord might be unable to be inserted through the two cord insertion holes as it could bend between the two holes, causing non-smooth insertion especially if the cord is soft.

SUMMARY OF THE INVENTION

It is therefore an object of this invention to provide a cord fastener in which a leading end of a soft cord can be inserted smoothly and in which a thick cord can be inserted without increasing a size of the cord fastener.

According to this invention, the above object is accomplished by a cord fastener comprising: a fastener body having a hollow and a pair of aligned first cord-insertion through-holes communicating with the hollow; and a slide to be slidably inserted in the hollow of the fastener body and having a pair of aligned second cord-insertion through-holes, said slide having a head, a pair of resilient legs extending downwardly from a lower surface of the head and a pair of supporting arms extending downwardly from the lower surface of the head, the second cord-insertion through-hole having an upper portion contiguous to the lower surface of the head. So, a leading end of the cord can be inserted smoothly through the fastener body and the slide along the lower surface of the head.

Preferably, the slide has a bridge extending between the respective lower ends of the pair of the supporting arms to bridge the second cord-insertion through-holes at their bottoms so that the leading end of the cord can be inserted along the upper surface of the bridge.

Further, the fastener body may have on a bottom thereof a guide portion between the pair of supporting arms of the slide to bridge the second cord-insertion through-holes at their bottoms so that the leading end of the cord can be inserted along the guide portion.

BRIEF DESCRIPTION OF THE DRAWINGS

FIG. 3 is a vertical cross-sectional view showing the cord fastener with a cord inserted through;

DETAILED DESCRIPTION OF THE PREFERRED EMBODIMENTS

Various preferred embodiments of this invention will now be described with reference to the accompanying drawings.

Figure 1:
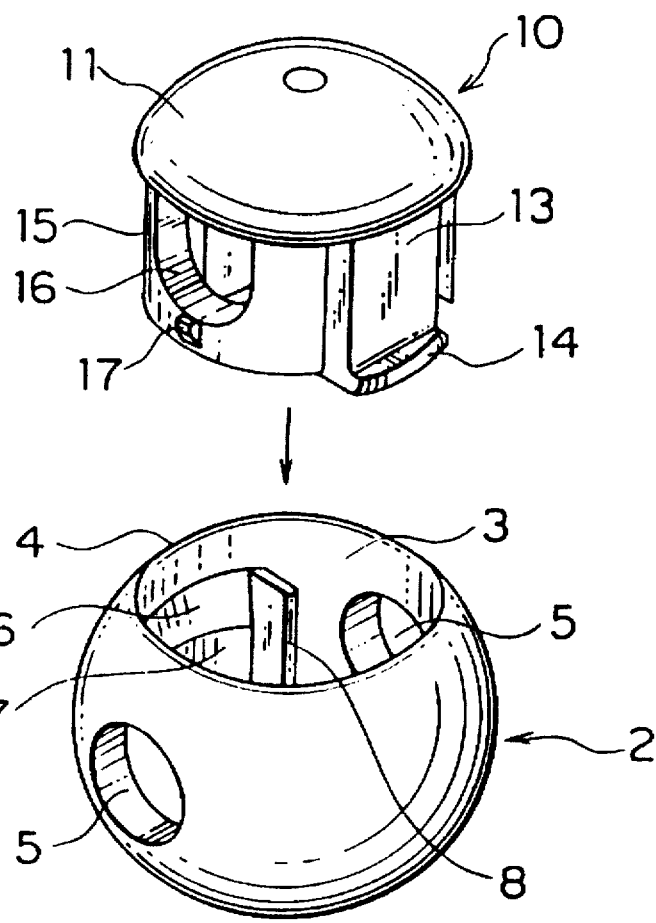
FIG. 1 is an exploded perspective view of a cord fastener according to a first embodiment of this invention.
Figure 4:
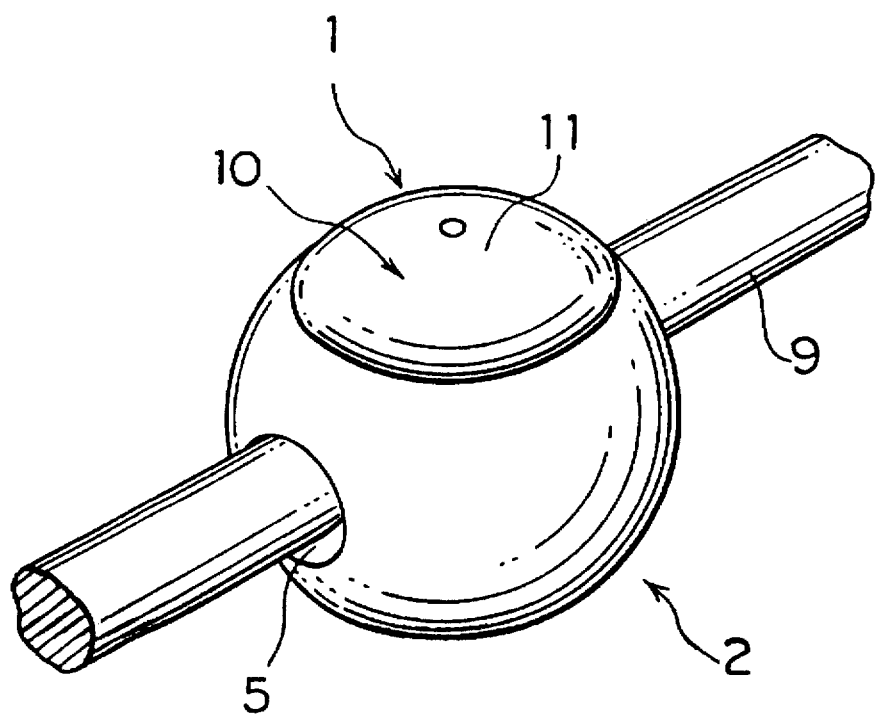
FIG. 4 is a perspective view of the cord fastener of FIG. 3.

FIG. 1 is an exploded perspective view of a cord fastener 1 molded of synthetic resin, according to this invention. The cord fastener 1 is a two-member structure composed of a fastener body 2 and a slide 10 slidably inserted in the fastener body 2. In use, a cord 9 is inserted through both the fastener body 2 and the slide 10 as shown in FIG. 4.

Figure 2:
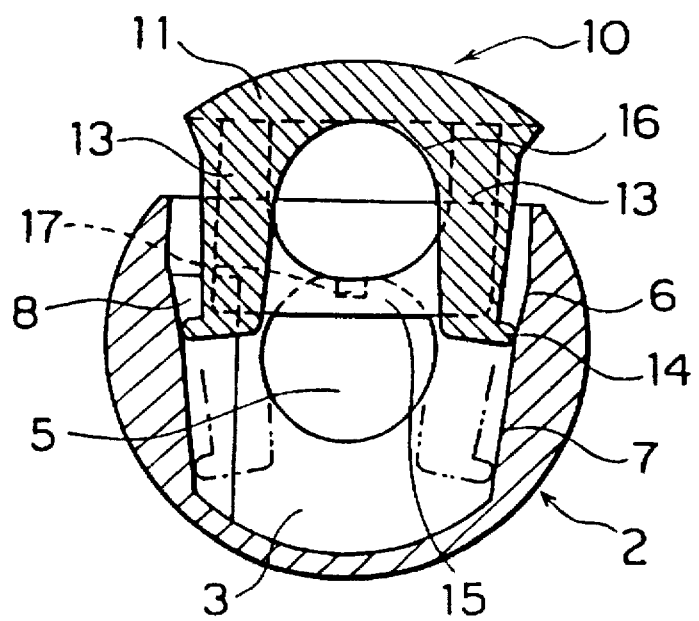
FIG. 2 is a vertical cross sectional view of the cord fastener as assembled.
Figure 7:
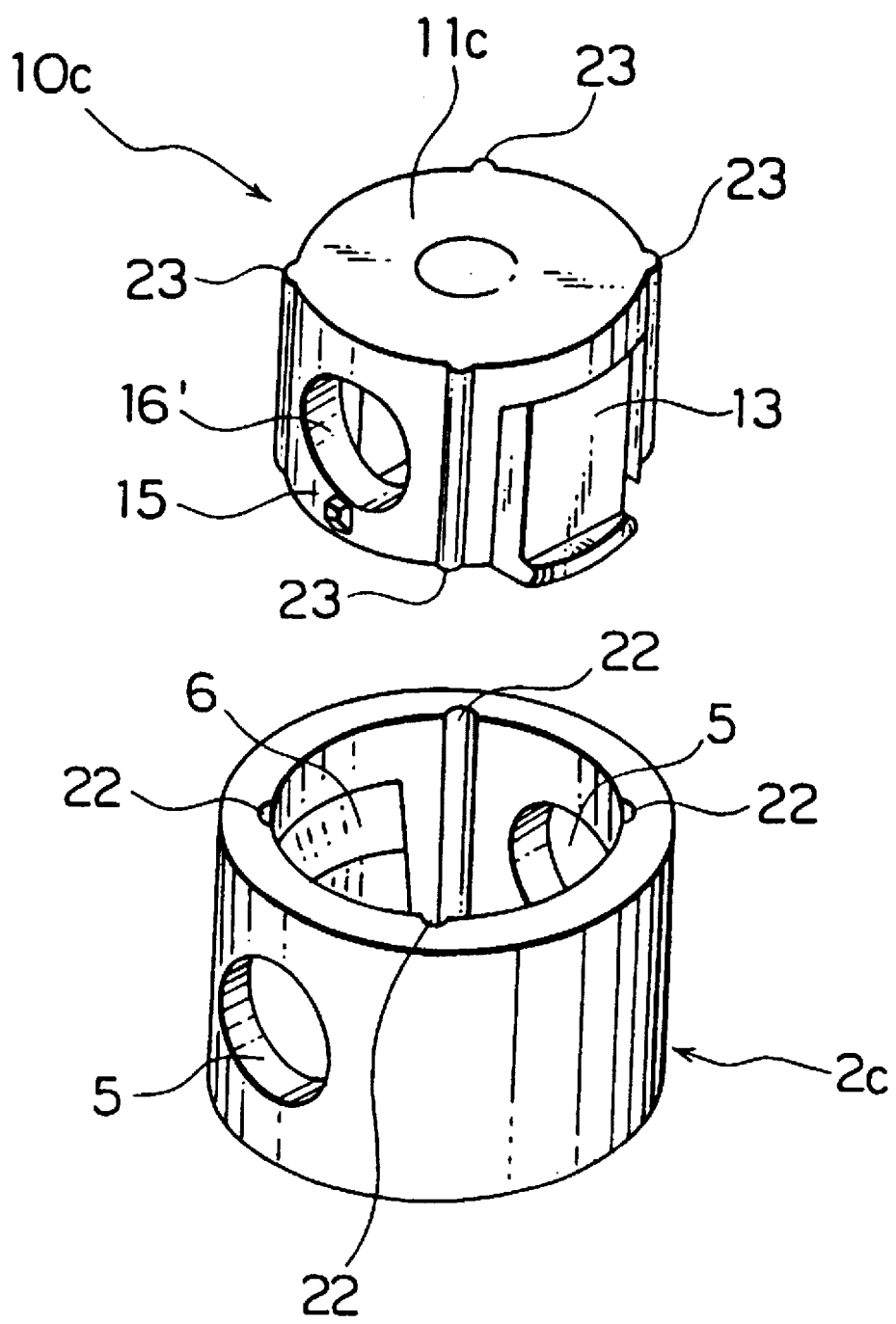
FIG. 7 is an exploded perspective view of still another modified cord fastener according to a fourth embodiment, showing a cylindrical contour.

The fastener body 2 is generally spherical in overall appearance, as shown in FIG. 1, having at its top a mouth 4 with a hollow 3 in which the slide 10 is to be inserted. The fastener body 2 additionally has on its side surface a pair of horizontal cord-insertion through-holes (hereinafter also called the first cord-insertion through-holes) 5, 5, which is confronting and aligned with each other. The fastener body 2 further has, on its inside wall surface at each of opposite sides of the first cord-insertion through-holes 5, a gentle slope 6 near the mouth and a steep slope 7 contiguous to the gentle slope 6, as shown in FIG. 2, for causing a pair of resilient legs 13, 13 of the slide 10 to resiliently deform, which will be described later. Furthermore, alongside the gentle and steep slope 6, 7, a pair of plate-like guides 8 are provided on opposite diagonal positions of the inside wall surface so as to project inwardly of the hollow 3 from the inside wall surfaces of the fastener body 2 and extend vertically. The guides 8 serve to vertically guide the slide 10 inserted in the fastener body 2 and to prevent the slide 10 from rotating in the hollow 3. Alternatively, a pair of guides 8 may be disposed on opposite sides of the gentle and steep slopes 6, 7. In another alternative form, a number of guide grooves 22 may be substituted for the plate-like guide portions 8 to receive a number of guide ridges 23 on the slide 10, as shown in FIG. 7.

The slide 10, as shown in FIG. 1, has a head 11 in the formed of a segment of a sphere, and a cylindrical tube portion projecting downwardly from a lower surface 12 of the head 11. The cylindrical tube portion of the slide 10 has a pair of resilient legs 13 and a pair of supporting arms 15 extending downwardly from the lower surface 12 of the head 11. The head 11 has a diameter slightly smaller than that of the mouth 4 of the fastener body 2 in order to be depressed into the hollow 3 of the fastener body 2, so that the fixed cord 9 can be released by depressing.

Each resilient leg 13 extends downwardly from the lower surface 12 of the head 11 and terminating in an outwardly swelling protuberance 14, being angularly spaced from the individual supporting arms 15, 15 by 90°. When the slide 10 is inserted into the hollow 3 of the fastener body 2, the resilient legs 13, 13 are resiliently deformed inwardly as shown in FIG. 2, as the protuberances 14, 14 slide on the gentle and steep slopes 6, 7. After the cord 9 is inserted through the fastener body 2 and the slide 10, the pressure by a user's finger is released from the head 11 of the slide 10 so that the slide 10 is automatically moved upwardly under the resiliency of the resilient legs 13, 13 to bend and fix the inserted cord 9.

Figure 5:
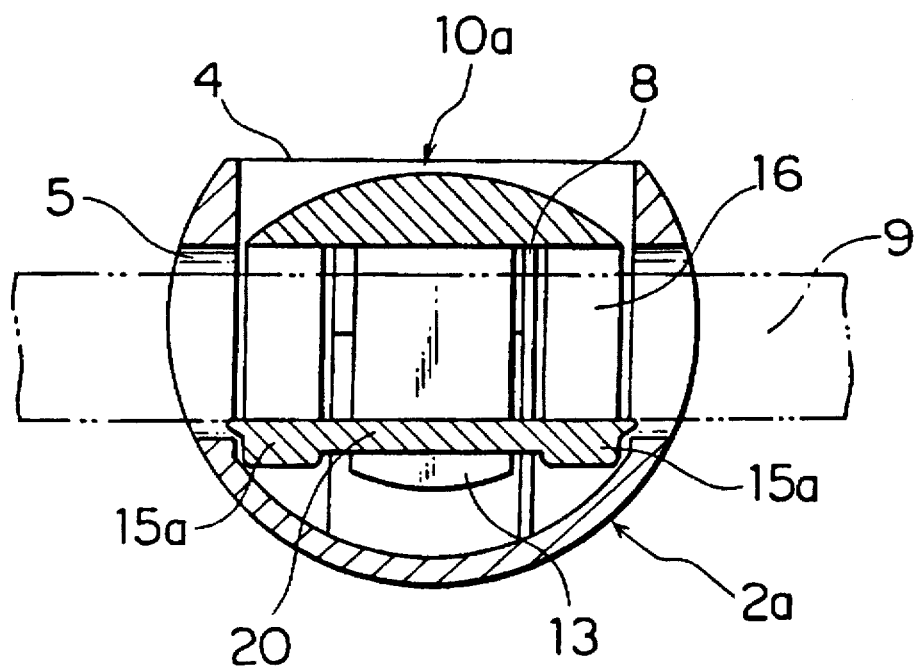
FIG. 5 is a vertical cross-sectional view of a modified cord fastener according to a second embodiment, showing a bridge extending between a pair of supporting arms of a slide.

The supporting arms 15, 15 have a pair of horizontal cord-insertion through-holes (hereinafter also called the second cord insertion through-holes) 16, 16, which are aligend with each other, as shown in FIG. 1; when the slide 10 is depressed in the hollow 3 of the fastener body 2, the first and second cord insertion through-holes 5, 16 are horizontally aligned with one another so that the cord 9 can be inserted through the fastener body 2 and the slide 10 smoothly as shown in FIG. 5. Each second cord-insertion through-hole 16 has a U shape with its horizontal top end flush with the lower surface 12 of the head 11 so that the leading end of the cord 9 can be guided smoothly along the lower surface 12 of the head 11 during the cord insertion, thus making the cord insertion easy. Alternatively, as shown in FIG. 7, each supporting arm 15 may has a circular cord-insertion through-hole 16' with its arcuate top end flush with the lower surface 12 of the head 11. Further, the supporting arm 15 has in its lower end an engaging portion 17 near the lower end of the second cord-insertion through-hole 16 as shown in FIG. 1. As the mouth 4 of the fastener body 2 or the supporting arms 15 of the slide 10 resiliently deforms and restores, the engaging portions 17 project into the first cord-insertion through-holes 5 of the fastener body 2 respectively. The engaging portions 17 then come into engagement with the upper end of the first cord insertion through-holes 5 when the slide 10 is moved upwardly as indicated by dotted lines of FIG. 2, thus preventing the slide 10 from accidental removal from the fastener body 2.

FIG. 2 is a cross-sectional view showing the cord fastener 1 in an assembled form in which the slide 10 is inserted in the hollow 3 of the fastener body 2, before the cord 9 is inserted through the cord fastener 1, with the engaging portions 17 of the slider 10 in engagement with the upper ends of the first cord-insertion through-holes 5 of the fastener body 2, as indicated by a dotted lines, so as to prevent the slide 10 from removing the fastener body 2.

Figure 3:
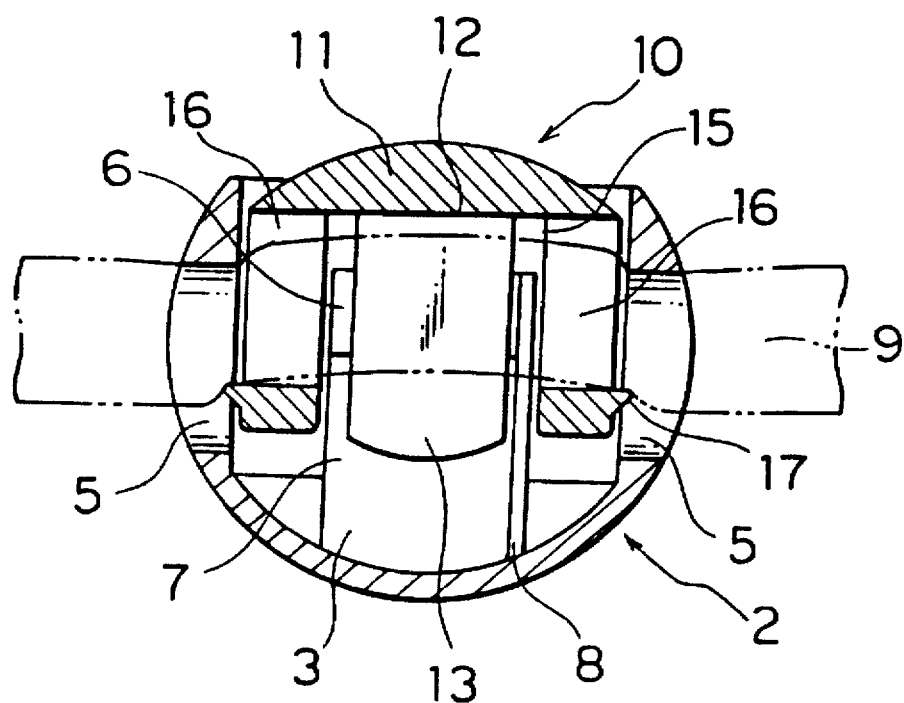

For threading the cord 9 through the cord fastener 1, firstly the head 11 of the slide 10 is depressed by a finger until the second cord-insertion through-holes 16 of the slide 10 are aligned with the first cord-insertion through-holes 5 of the fastener body 2, during which the resilient legs 13, 13 resiliently deform inwardly as they slide from the gentle slope 6 to the steep slope 7 of the inner wall surof the fastener body 2. Secondly the cord 9 is inserted through one of the first cord-insertion through-holes 5 of the fastener body 2, then it is inserted through the second cord-insertion through-holes 16 of the slide 10 as its leading end is guided along the lower surface 12 of the head 11, and finally it is inserted through the other first cord-insertion through-hole 5 of the fastener body 2. As the finger's pressure is released from the head 11 at a desired position of the inserted cord 9, the slide 10 is upwardly moved under the resiliency of the resilient legs 13, 13 so as to bend the inserted cord 9, as shown in FIG. 3, thus immovably fastening the cord 9. For unfastening the cord 9, the head 11 of the slide 10 is depressed again until the first cord-insertion through-holes 5 of the fastener body 2 are aligned with the second cord-insertion through-holes 16 of the slide 10 so that the cord 9 can be moved freely.

Figure 6:
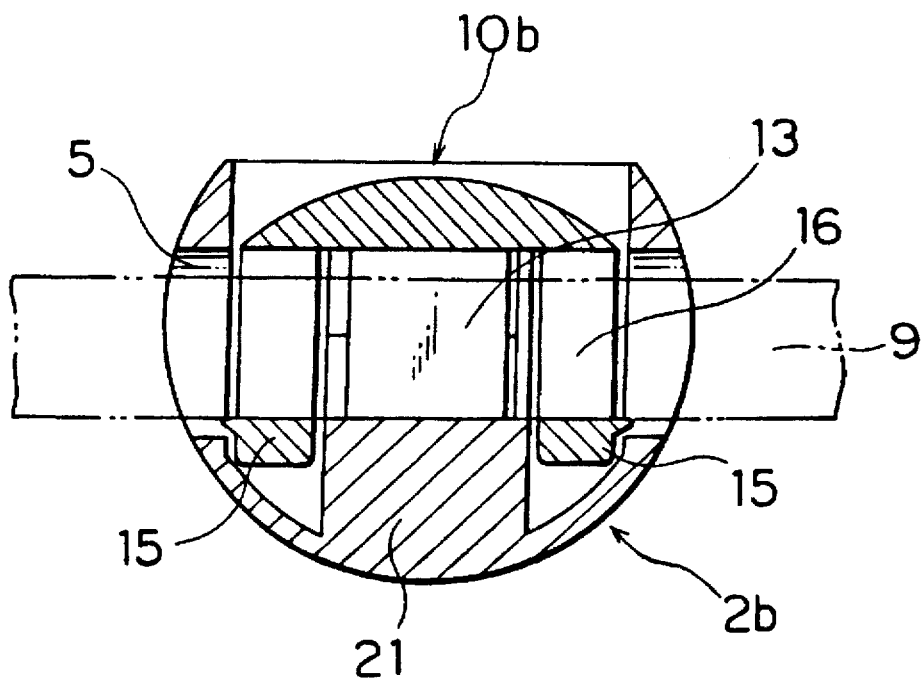
FIG. 6 is a vertical cross-sectional view of another modified cord fastener according to a third embodiment, showing a guide portion projecting inwardly from the bottom of a fastener body.

FIGS. 5 and 6 show another embodiments. In the embodiment shown in FIG. 5, a fastener body 2a is similar to the fastener body 2 shown in FIG. 1 in structure, in which a modified slide 10a has a bridge 20 extending between a pair of supporting arms 15a, 15a to bridge the bottoms of the second cord insertion through-holes 16, 16 so that the leading end of the cord 9 can be guided along the upper surface of the bridge 20, thus facilitating inserting the cord 9.

FIG. 6 shows still another embodiment, in which a modified fastener body 2b has a guide portion 21 projecting from the bottom of its hollow to bridge the second cord insertion through-holes 16, 16 of the supporting arms 15, 15 of the slide 10b at their bottoms so that the leading end of the cord 9 can be guided along the upper surface of the guide portion 21, facilitating inserting the cord 9. In these embodiment shown in FIGS. 5 and 6, the leading end of the cord 9 may be guided on the lower surface 12 of the head 11 of the slide 10a or 10b, which is flush with the upper end of the second cord-insertion through-holes 16, 16 so that the cord 9 can be inserted smoothly.

FIG. 7 shows a further embodiment, in which a modified fastener body 2c is in a form of a cylindrical tube, and a modified slide 10c to be inserted into the fastener body 2c is also in a form of a cylindrical tube with a flat head 11c. In this embodiment, the fastener body 2c has a number of guide grooves 22, and the slide 10c has a number of guide ridges 23 to be received in the respective guide grooves 22, so that the slide 10c can be guided smoothly without rotating in the hollow 6 of the fastener body 2c.

With the foregoing arrangement, since the supporting arms 15, 15 of the slider 10 have the respective second cord-insertion through-holes in such a manner that the upper end of the holes 16, 16 are flush with the lower surface 12 of the head 11, these two through-holes are bridged by the lower surface 12 of the head 11 so that the leading end of the cord 9 inserted from one of the through-holes 16, 16 can be guided along the lower surface 12 of the head 11 into the other one of the through-holes, thus facilitating insertion of the cord. Further, since the second cord-insertion through-holes 16, 16 are disposed near the upper ends of the supporting arms 15, 15 toward the head 11, it is possible to increase the diameter of the cord-insertion through-holes 16, 16 as they are free from being obstructed by the resilient legs 13, 13, which are resiliently deformed inwardly due to the steep slope 7 inside the fastener body 2, 2a, 2b, 2c. It is therefore possible to use a thick cord without increasing the entire size of the cord fastener 1.

Furthermore, since the slider 10a has a bridge 20 extending between the lower ends of the supporting arms 15a, 15a to bridge the second cord-insertion through-holes 16, 16 at their bottoms, it is possible to guide the leading end of the cord 9 while the cord 9 is inserted, thus causing smooth insertion. The bridge 20 reinforces the supporting arms 15a, 15a, so that it is possible to increase the diameter of the second cord-insertion through-holes 16, 16 without increasing the entire size of the cord fastener 1.

Still further, since the fastener body 2b has a guide portion 21 projecting from the bottom of the hollow 6 to bridge the second cord insertion through-holes 16, 16 of the inserted slide 10b, it is possible to guide the leading end of the cord 9 along the upper surface of the guide portion 21, facilitating inserting the cord 9. The guide portion 21 serves to reinforce the fastener body 2b so that it is possible to increase the diameter of the first cord-insertion through-holes 5, 5 without increasing the entire size of the cord fastener 1.

What is claimed is:

1. A cord fastener comprising:
   (a) a fastener body having a hollow and a pair of aligned first cord-insertion through-holes communicating with said hollow; and
   (b) a slide to be slidably inserted in said hollow of said fastener body and having a pair of aligned second cord-insertion through-holes, said slide having a head, a pair of resilient legs extending downwardly from a lower surface of said head and a pair of supporting arms extending downwardly from said lower surface of said head, said second cord-inserting through-holes located on said supporting arms, each of said second cord-insertion through-holes located contiguous to said lower surface of said head, said first and second cord-insertion through-holes alignable against an urging of said resilient legs to thread a cord therethrough.

2. A cord fastener according to claim 1, wherein said slide has a bridge extending between the respective lower ends of said pair of supporting arms to bridge said second cord-insertion through-holes at their bottoms.

3. A cord fastener according to claim 2, wherein said fastener body includes a pair of plate-like guides provided on opposite diagonal positions of inside wall surfaces of said fastener body so as to project inwardly of the hollow from the inside wall surfaces of the fastener body and extend vertically.

4. A cord fastener according to claim 1, wherein said fastener body has on a bottom of thereof a guide portion between said pair of supporting arms of said slide so as to substantially bridge said second cord-insertion through-holes at their bottoms for guiding a cord to be inserted through said first and second cord-insertion through-holes.

5. A cord fastener according to claim 4, wherein said guide portion includes a pair of plate-like guides provided on opposite diagonal positions of inside wall surfaces of said fastener body so as to project inwardly of the hollow from the inside wall surfaces of the fastener body and extend vertically.

6. A cord fastener according to claim 1, wherein said fastener body includes a pair of plate-like guides provided on opposite diagonal positions of inside wall surfaces of said fastener body so as to project inwardly of the hollow from the inside wall surfaces of the fastener body and extend vertically.

* * * * *